United States Patent [19]
Chandler

[11] 3,760,965
[45] Sept. 25, 1973

[54] CYCLE CARRIER

[75] Inventor: Roy L. Chandler, Arlington, Tex.

[73] Assignee: Red Ant Products, Inc., Mansfield, Tex.

[22] Filed: Jan. 14, 1972

[21] Appl. No.: 217,751

[52] U.S. Cl. .............................. 214/450, 224/42.08
[51] Int. Cl. ............................................. B60r 9/00
[58] Field of Search .................. 214/450; 224/42.08

[56] References Cited
UNITED STATES PATENTS

| | | |
|---|---|---|
| 3,366,256 | 1/1968 | Meredith ............................ 214/450 |
| 3,567,052 | 3/1971 | Allen .................................. 214/450 |
| 3,529,737 | 9/1970 | Daugherty ......................... 214/450 |
| 3,458,073 | 7/1969 | Dawson ............................. 214/450 |

Primary Examiner—Robert G. Sheridan
Assistant Examiner—John Mannix
Attorney—Wm. To Wofford et al.

[57] ABSTRACT

The specification discloses a carrier for carrying a motorcycle or the like on a motor vehicle and comprises two support arms adapted to be coupled to a motor vehicle for supporting a channel or rail in a varrying position for carrying a motorcycle next to the motor vehicle. One end of the channel is pivotally coupled to one of the arms for pivotal movement about a pivot axis which is tilted or inclined in a lateral direction relative to the motor vehicle and upward and away from the other arm in a plane extending between the two support arms. When the other end of the channel is swung out, the channel pivots downward toward the ground and also tilts to facilitate loading and unloading.

18 Claims, 24 Drawing Figures

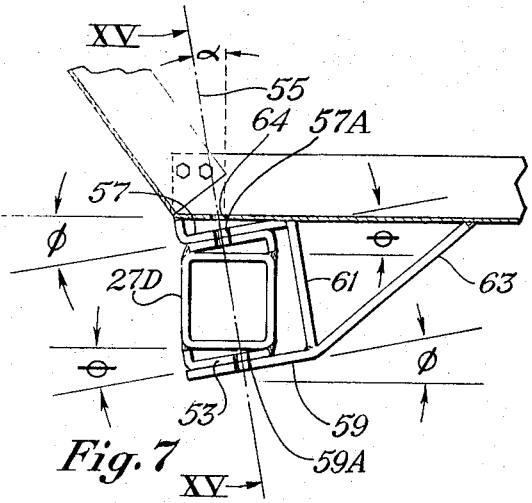
Fig.7
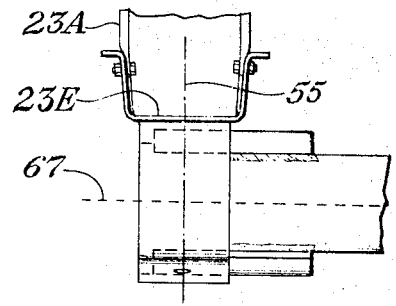
Fig.11
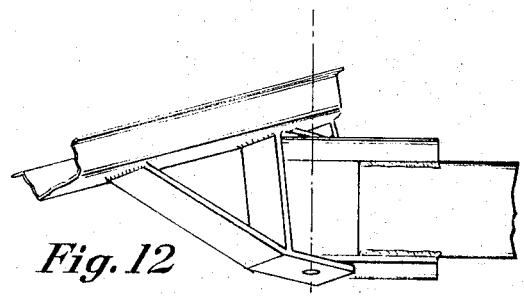
Fig.12
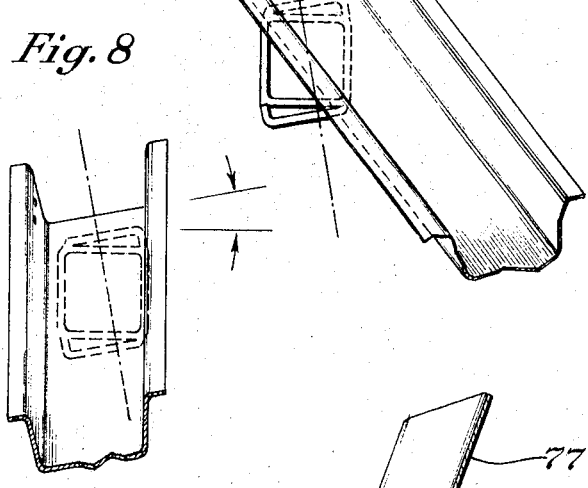
Fig.8
Fig.9
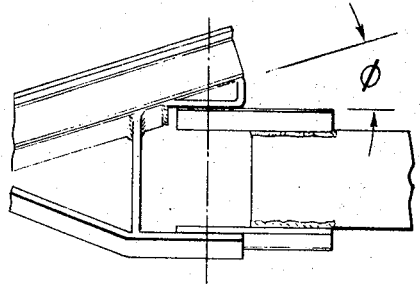
Fig.13
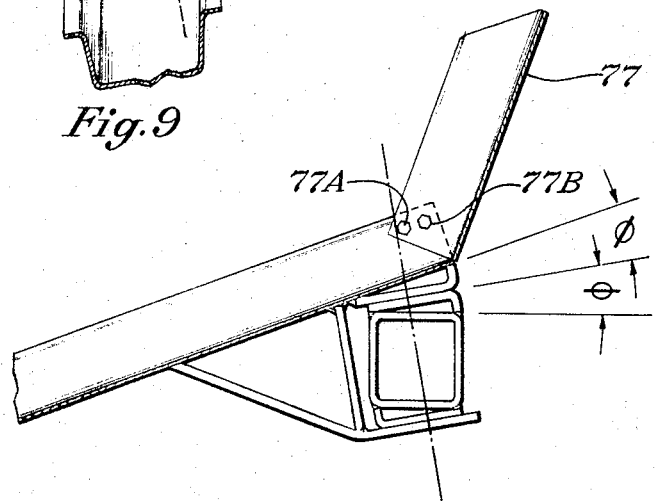
Fig.10
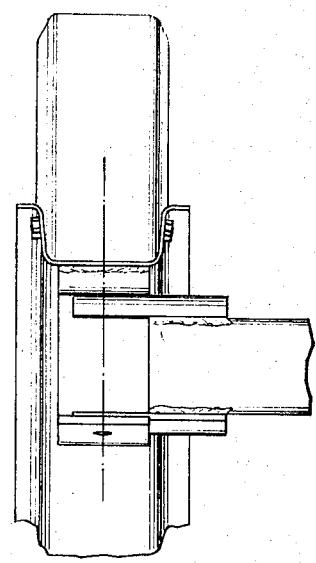
Fig.14

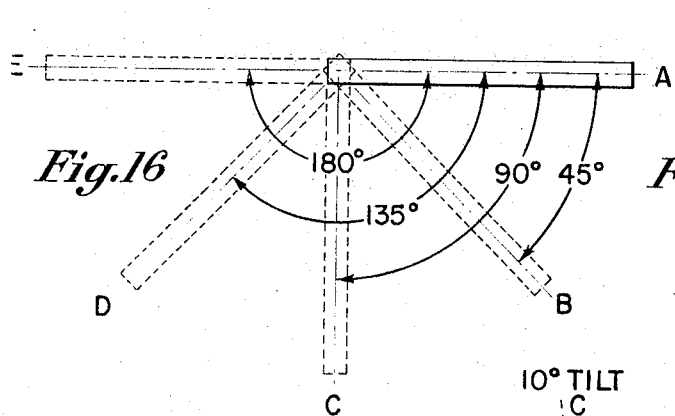
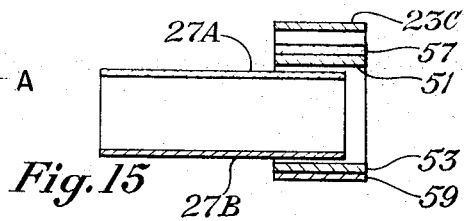
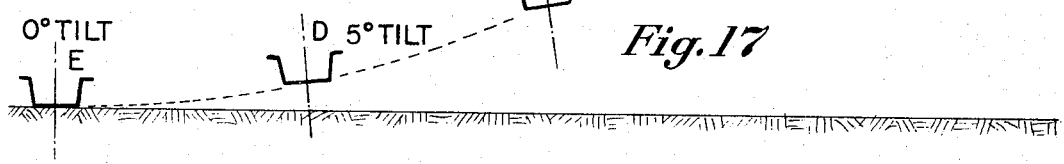
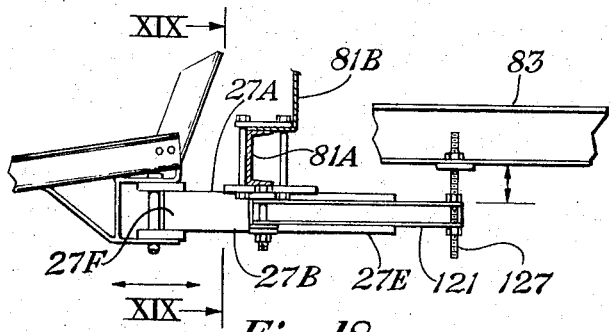
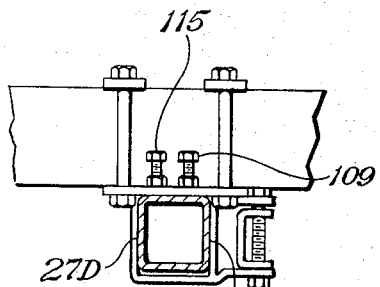
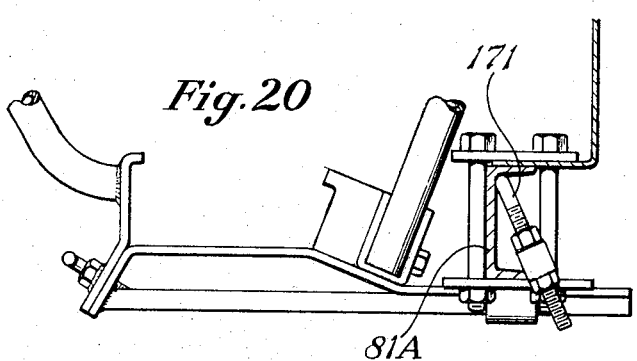
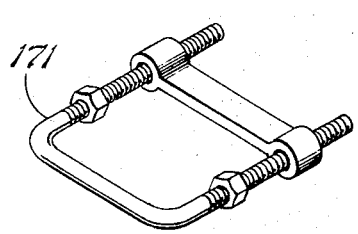

CYCLE CARRIER

BACKGROUND OF THE INVENTION

This invention relates to a carrier for carrying a motorcycle or the like on a motor vehicle and which is constructed in a manner to facilitate loading and unloading.

Heretofore, motorcycle carrying devices for attachment to a motor vehicle have been proposed or built, however, they have disadvantages in that they are difficult to load and unload.

SUMMARY OF THE INVENTION

In accordance with the present invention, there is provided a carrier for carrying a motorcycle or the like on a motor vehicle and which may be easily loaded or unloaded. The carrier comprises an elongated frame member having a base and two extending side means for supporting a two wheeled cycle. Two support means are adapted to be coupled to a motor vehicle at spaced apart positions for supporting opposite ends of the frame member to support and hold the frame member to the vehicle in a carrying position with one edge of the frame member facing outward and the other edge facing inward of the motor vehicle. Means is provided for pivotally coupling one end of the frame to one of the support means for pivotal movement about a pivot axis to allow the other end of the frame member to be pivoted from the other support means outward and downward toward the ground and back to the other support means. When the frame member is moved to its outward positions, the pivotal means also causes the width of the frame member to tilt toward the ground.

In one aspect, the pivot axis is inclined upward and away from the other support means when the two support means are coupled in place to a motor vehicle whereby the length of the frame member will slope downward and its width will tilt when the frame member is pivoted to positions outward from the carrying position.

In the embodiment disclosed, the support means to which the frame member is pivotally coupled, includes a surface located in a plane generally perpendicular to the pivot axis and which slopes downward toward its outer side. The frame member includes structure at its pivot end having a surface adapted to engage and extend parallel to the sloping surface of the support means when the pivot end of the frame member is pivotally coupled to the support means.

In a further aspect, the pivot axis extends through both of the surfaces and is located generally in a vertical plane extending between the two support means when coupled in place to a motor vehicle.

In another embodiment there is provided an adjustable swing stop for stopping the frame member during swingdown when its end is slightly off of the ground, when unloaded, to allow the springs of the motor vehicle to aid in the lifting of the motorcycle and to facilitate swingback when loaded.

BRIEF DESCRIPTION OF THE DRAWINGS

FIGS. 7, 8, 9, and 10 are views of the carrier as seen from the rear end of the motor vehicle showing the supporting rail or channel: in its carrying position with 0° of rotation; in a position rotated outward from the vehicle between 0° and 90°; in a position rotated 90° from its carrying position; and in a position rotated 180° from its carrying position;

FIGS. 11, 12, 13, and 14 illustrate the channel or rail of the carrier as seen from the right side of the vehicle and which corresponds to the positions of FIGS. 7, 8, 9 and 10 respectively;

FIG. 15 is a cross-section of FIG. 7 taken through lines 15–15 and which coincides with the pivot axis;

FIG. 16 is a top view illustrating five positions A-C to which the rail or channel may be pivoted or swung;

FIG. 17 illustrates the tilt of the rail or channel when it is at the five positions A-C of FIG. 16;

FIG. 18 is a side view of the pivot support arm showing its connection to the frame and bumper of a motor vehicle;

FIG. 19 is a cross-section of FIG. 18 taken through the lines 19–19 thereof;

FIG. 20 is a side view of the other support arm;

FIG. 21 illustrates a U-bolt employed as a brace and for adjusting the level of the support arm of FIG. 20;

DETAIL DESCRIPTION OF THE PREFERRED EMBODIMENT

Figure 1:
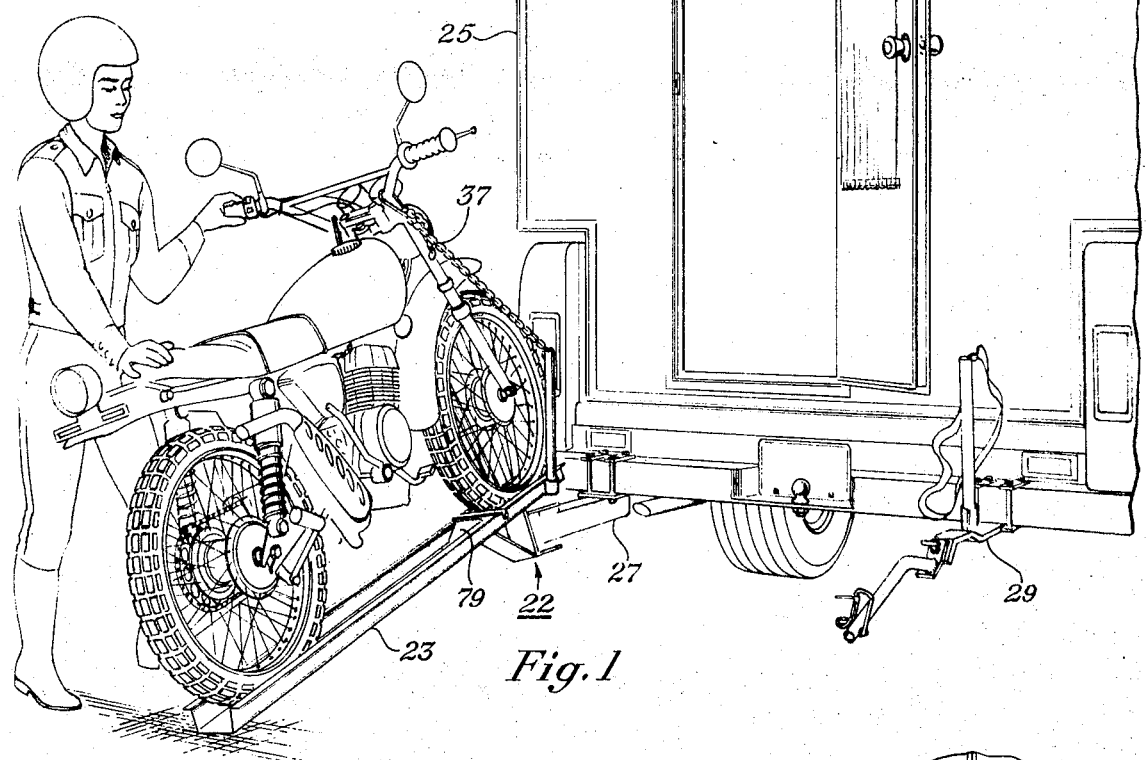
FIGS. 1 and 2 illustrate the carrier of the present invention which with its channel or rail pivoted outward and downward to the ground with a motorcycle coupled thereto.

Referring to FIGS. 1–5, the carrier of the present invention is identified by reference character 22 and comprises a channel or rail 23 which is supported in a carrying position next to a motor vehicle 25 by two support arms 27 and 29 coupled to the motor vehicle. The rail 23 comprises two sides 23A and 23B extending upward from a bottom or base 23C thereby forming a channel into which the wheels of a motorcycle may be driven and supported. In the carrying position, a plane through the center of the base 23C and perpendicular thereto is vertical or tilted slightly forward relative to the motor vehicle whereby a motorcycle supported in the channel is located and supported next to the motor vehicle in a vertical plane or in a plane tilted slightly forward.

One end 23D of the channel 23 is pivotally coupled to support arm 27 whereby the channel may move from its carrying position outward from the vehicle and to a position 180° from the carrying position as illustrated in FIGS. 10–14 and 16. As the channel or rail 23 moves outward, its end 23E moves downward until it touches the ground (when the channel is loaded with a motorcycle) to form a ramp whereby a motorcycle may be rolled from the channel onto the ground for unloading or rolled from the ground up into the channel for loading purposes. With the pivot arrangement of the present invention, the end 23E of the channel is capable of continually moving downward to approach the ground as it rotates to its 180° position thereby providing a wide angular range at which the end 23E may touch the ground to facilitate unloading onto different ground levels that may be encountered behind the motor vehicle 25. Generally the end 23E will touch the ground (when the channel is loaded) between the 135° and 180° position.

Figure 2:
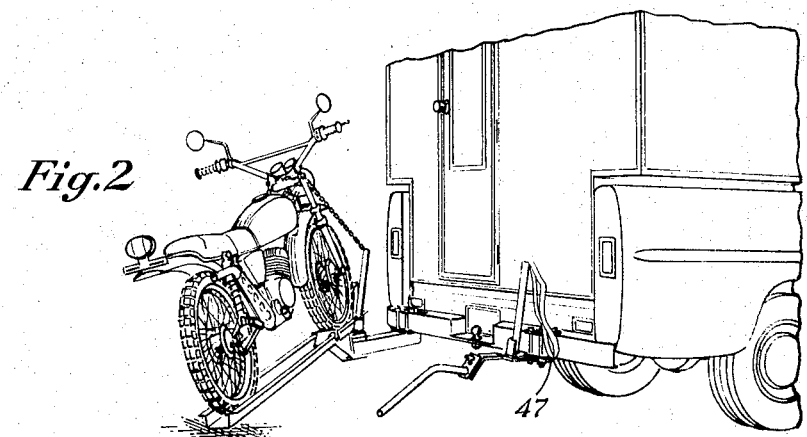
Figure 3:
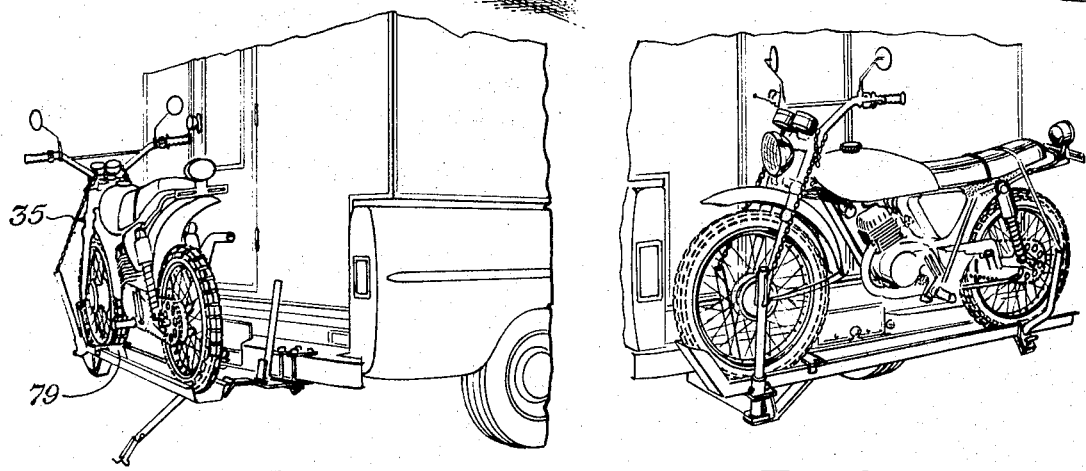
FIG. 3 illustrates the carrier with its channel or rail supporting a motorcycle and pivoted slightly away from its carrying position.
Figure 4:
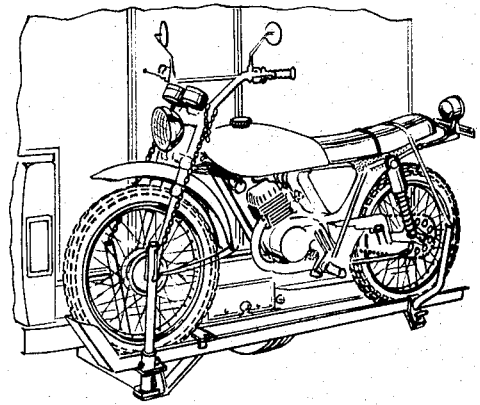
FIG. 4 illustrates the carrier with its channel or rail supporting a motor vehicle and locked in its carrying position next to the motor vehicle.

In addition, as the channel 23 rotates between its 0° and 180° position, the side 23A and hence the base 23C tilts downward. Thus when the end 23E of the channel rests on the ground for loading and unloading purposes, the width of the channel will be tilted (assuming that the channel is not at its 180° position). This allows one to load and unload the motorcycle from the left side (in the embodiment disclosed), with the motorcycle leaning toward the person as illustrated in FIGS. 1 and 2. This facilitates loading and unloading in that it minimizes the danger of the person losing his balance and hence losing the motorcycle over the far side of the channel. In addition with the motorcycle learning toward the person, it may be more easily strapped to or unstrapped from the channel without the danger of losing the motorcycle over the far side.

Figure 6:
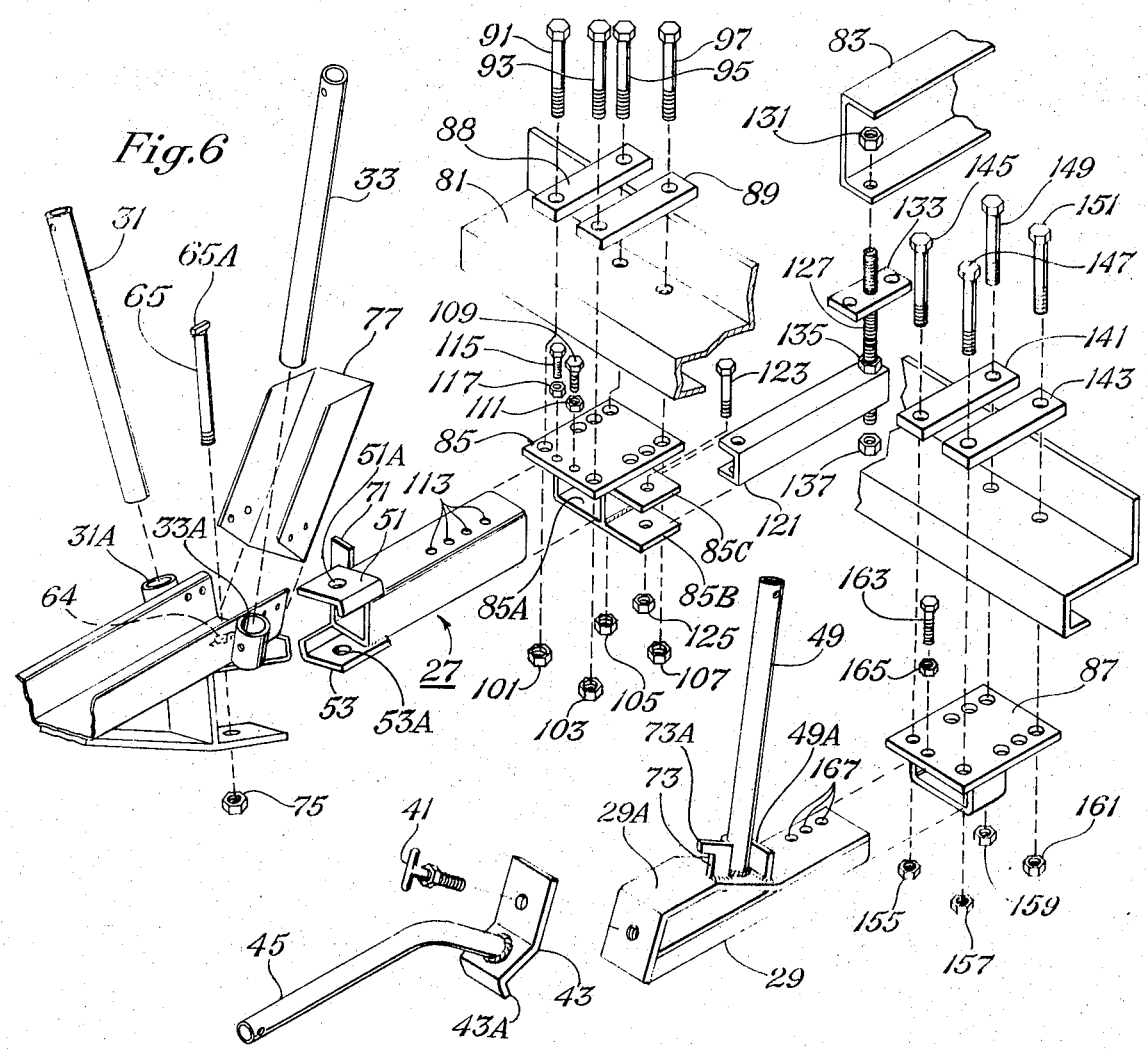
FIG. 6 illustrates a break-down of the components forming the carrier of the present invention.
Figure 5:
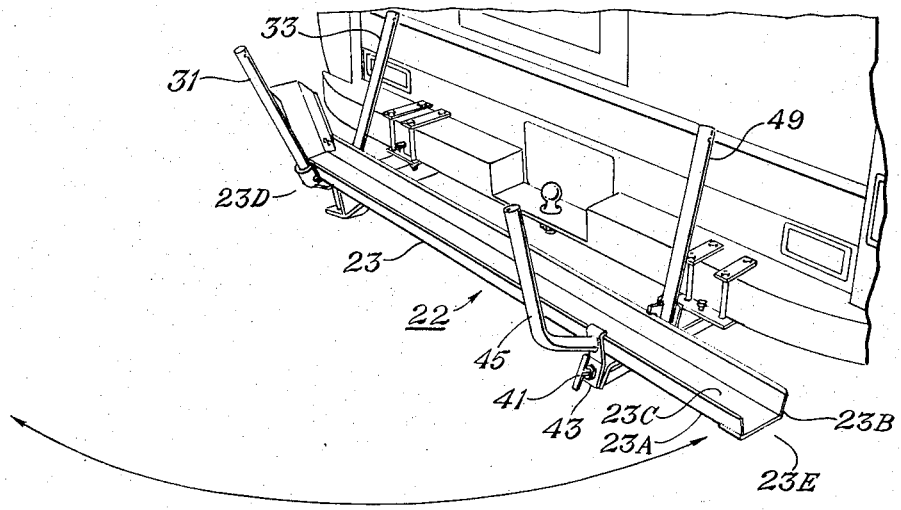
FIG. 5 illustrates the carrier with its channel or rail locked in its carrying position without a motorcycle supported thereon.

Coupled to the end 23D of the rail 23 are two supporting posts 31 and 33 to which the motorcycle may be coupled with chains, illustrated at 35 and 37, for securing the motorcycle to the channel while loading. After the motorcycle has been secured to the channel during loading, the channel then may be swung to the right to its carrying position where the end 23E will rest upon the top surface 29A of the arm 29 (see FIG. 6). In the carrying position, as indicated previously, the motorcycle is located and supported in a vertical plane or in a plane tilted slightly forward which has advantages in that there is no tendency for the motorcycle to swing back against the person while locking the channel in place. The channel is locked in place by employing a T-bolt 41 to secure a clamp 43 to the support arm 29 with its lip 43A (see FIG. 6) extending over the side 23A of the channel 23. Coupled to the clamp 43 is a support rod 45 which extends upward when the clamp 43 is secured to the arm 29 in position to lock the channel 23 in place. A chain or cord 47, tied to a rod 49 which is coupled to the arm 29, is extended over the rear end of the motorcycle and tied to the rod 45 for securing the rear end of the motorcycle in place. Since the motorcycle is supported in a vertical plane or in a plane tilted slightly forward when the channel 23 is locked in its carrying position, there is a minimum of load outward against the locking means and in addition the motorcycle is carried in a minimum of space behind the motor vehicle.

Referring now to FIGS. 6–22, the coupling arrangement for pivotally coupling the channel 23 to the support arm 27 will be described in detail. The support arm 27 comprises a metal tube, square in cross-section, having parallel upper and lower sides 27A and 27B, and inner and outer sides 27C and 27D respectively (see FIGS. 18 and 19). The end 27E is adapted to be coupled to the motor vehicle whereby the top and bottom sides 27A and 27B are generally horizontal. Welded to the top and bottom sides 27A and 27B at the extending end 27F are two sloping cheek plates 51 and 53 (see FIGS. 6 and 7) forming parallel surfaces which slope downward at an angle $\theta$ relative to the sides 27A and 27B. In one embodiment $\theta$ may be equal to 10°. Extending through the cheek plates 51 and 53 are two apertures 51A and 53A respectively which are located to be in alignment with an axis 55 perpendicular to the planes of the surfaces of plates 51 and 53. Welded to the base 23C of the channel 23 at its end 23D is a cheek plate 57. A plate 59, supported by plates 61 and 63, which also are welded to the base of the channel 23, is spaced below the plate 57 and parallel thereto. Both of plates 57 and 59 are at an angle $\phi$ relative to the base of the channel 23. The angle $\phi$ is equal to $\theta$. As illustrated in FIG. 7, plates 57 and 59 are adapted to fit around plates 51 and 53; to engage these plates; and be parallel thereto. Extending through plates 57 and 59 are two apertures 57A and 59A respectively which are located to be in alignment with the axis 55 and the apertures 51A and 53A respectively when the plates 57 and 59 are slipped around the plates 51 and 53. Also extending through the base 23C of the channel is an aperture 64 located to be in alignment with the axis 55 when the plates 57 and 59 are slipped around plates 51 and 53. In this position a pivot rod 65 may be inserted through the apertures 64, 57A, 51A, 53A, and 59A to pivotally couple the channel 23 to the support arm 27. The axis 55 is inclined laterally with respect to the motor vehicle and upward and away from the support arm 27 when the support arms are secured in place to the vehicle. It is at an angle $\alpha$ with respect to a line perpendicular to the top surface 27A of the support arm 27. The angle $\alpha$ is equal to $\theta$ and hence to $\phi$. In the plane of inclination or tilt of the pivot axis 55 as defined by the angle $\alpha$, the pivot axis 55 is perpendicular to the elongated axis 67 of the support arm 27 as illustrated in FIG. 11.

In a cross-section of FIG. 7 and taken through the axis 55, and as illustrated in FIG. 15, the edges of plates 51 and 53 are parallel to the top and bottom sides 27A and 27B of the support arm 27 while the edges of plates 57 and 59 are parallel to the base 23C of the channel 23 and hence parallel to the edges of plates 51 and 53. Since the angles $\theta$ and $\phi$ are equal to each other but opposite when the channel 23 is in its carrying position as illustrated in FIGS. 7 and 11, the base 23C of the channel will be parallel to the top and bottom sides 27A and 27B of the support arm 27. Generally the arm 27 will be coupled to the vehicle whereby the sides 27A and 27B are in a horizontal plane. Thus in the carrying or 0° position, the base of the channel, along its length will be located in a horizontal plane with no slope thereto. In addition, as illustrated in FIG. 11 and in FIG. 17 at A, the base 23C, along its width also will be in a horizontal plane with no tilt thereto.

As the channel 23 is rotated or pivoted outward, however, plates 57 and 59 rotate about the pivot axis 55 while following the surfaces of plates 51 and 53 respectively, whereby the channel 23 slopes downward and also tilts. Between the 0° and 180° positions of the channel, tilting increases to a maximim and then decreases, with the maximum tilt being achieved at the 90° position of the channel. Thus, when rotating the channel from its 0° position to its 90° position, the tilt will increase from zero to the maximum. If $\theta$ is equal to 10°, then the maximum tilt will be 10°. Upon further rotation from the 90° position to the 180° position of the channel, the tilt will decrease from the maximum to zero. This is illustrated in FIG. 17.

The downward slope of the channel, however, continually increases from zero to a maximum as the channel is rotated from its 0° position to its 180° position. At the 90° position of the channel, the slope is equal to one-half of its maximum attainable value. At the 180° position of the channel, angles $\theta$ and $\phi$ are additive whereby a maximum slope is achieved. If $\theta$ and $\phi$ each is equal to 10° then the maximum slope that can be achieved is 20°.

Generally the channel 23 will touch the ground (when loaded) between its 135° and 180° positions as indicated above. The channel is self-lifting in that it raises as it is swung by the operator counterclockwise to the carrying position. Since the channel tilts between its 0° and 180° positions, a clockwise force or load component will be exerted against the operator between these positions, with the maximum occurring at the 90° position. Between the 135° and 180° positions and between the 45° and 0° positions, however this force will be minimal or relatively small. Since a motorcycle will be loaded on the channel generally while it is between its 135°–180° positions, the operator will begin his swingback of the channel from a start position where the force against him is small. Upon continuing the swingback, momentum will be developed by the time the channel reaches its 90° position thus overcoming the load against the operator at this position. From the 45° position back, the load begins to level out and at the 0° position there will be no load against the operator.

Secured to the support arm 27 is a stop 71 (see FIG. 6) which prevents rotation of the channel beyond 180°. Also secured to arm 29 is a stop 73 which prevents the channel from being rotated beyond its 0° position. An extending edge 73A facilitates locking the channel in place when it is located in its 0° position and resting upon the top surface 29A of the support arm 29. When it is desired to unload a motorcycle or the like, the T-bolt 41 is unscrewed and the clamp 43 and hence the rod 45 is turned or rotated downward out of the way of the channel 23 whereby it may be rotated or pivoted to its outward and downward positions.

The pivot pin 65 has a rectangular shaped head 65A which keys into aperture 64 which has rectangular shaped ends to prevent the pivot pin 65 from rotating. After the pivot pin 65 is inserted in place a nut 75 is threaded to its lower end to securely hold the pivot pin 65 in place. Rods 31 and 33 are inserted in cylindrical tubes 31A and 33A respectively welded to the sides of the channel 23. Rod 49 is welded to the top of the arm 29 and located in a bight formed in a curved plate 49A welded to the top of the arm 29.

Secured to the end 23D of the channel 23 is a channel member 77 which extends upward at an angle and which acts as a stop and as a brace for the front wheel of the motorcycle. The channel member 77 is secured to channel 23 by bolts 77A and 77B (see FIG. 10). After a motorcycle is loaded onto the channel 23 a stop 79 (see FIG. 1) is secured in the channel 23 behind the front wheel.

In the present embodiment, the carrier is illustrated as being coupled to the rear end of a pick-up truck however it is to be understood that with modifications, it could be coupled to campers, travel trailers, mobile homes, automobiles, either at the rear end, or the front end thereof. In addition, instead of having the pivot arm 27 located on the left (as viewed from the rear of the motor vehicle in FIGS. 1–4) it is to be understood that the pivot arm 27 could be modified and located on the right side. In this alternative, the ramp or channel 23 would pivot counterclockwise from its 0° carrying position to its 180° full open position.

Referring to FIGS. 6 and 18–21, the arrangement for coupling the support arms 27 and 29 to the rear of a pick-up truck will be described in detail. In these FIGS., reference numeral 81 identifies the bumper while reference numeral 83 identifies the truck frame. As illustrated in FIG. 18, the bumper is formed by a channel 81A and a top plate or member 81B secured together. Arm 27 is supported in a socket 85 which is coupled to the bumper 81 and to the truck frame 83 while arm 27 is supported in a socket 87 which is coupled to the bumper 81. Socket 85 is coupled to the bumper 81 by way of clamp bars 88 and 89, bolts 91, 93, 95, and 97 and nuts 101, 103, 105, and 107 respectively. The inner end 27 of the arm 27 is inserted into 27E square aperture 85A formed in the socket and the arm 27 is held in place by a bolt 109 threaded into nut 111 which is welded to the top of the socket 85. Bolt 109 is threaded through the nut 111 and through an aligned aperture formed in the top of the socket 85 and into either one of apertures 113 formed through the top side 27A of the arm 27. The apertures 113 are provided to allow the arm 27 to be adjusted at different positions outward from the bumper. A bolt 115 is threaded into a nut 117 also welded to the top of the socket 85. The bolt 115 is threaded through the nut 117 and through an aligned aperture formed through the top of the socket 85 whereby the bolt 115 will bear upon the top surface 27A of the arm 27 to cause the arm 27 to rotate to allow adjustments of the channel 23 depending upon the weight of the motorcycle desired to be carried. For example if a heavy motorcycle is to be loaded, the bolt 115 will be threaded inward to rotate the arm 27 in a counterclockwise position to cause the end 23E of the channel to be uplifted to insure that the base of the channel will ride smoothly upon the surface 29A of the support arm 29 when the channel is moved to its supporting position with a motorcycle coupled thereto. The inside dimensions of the aperture 85A of the socket 85 will be sufficient to allow the arm 27 to be rotated to a desired supporting position by adjustment of bolt 115.

The socket 85 is secured to the frame 83 by way of an extension arm 121. This arm fits into extending tabs 85B and 85C and is secured to the tabs by way of a bolt 123 and a nut 125. The other end of the arm 121 is coupled to the frame 83 by way of a threaded member 127 extending through the arm 121 and also extending through the lower side of the frame 83 through suitable apertures. The threaded member 127 is coupled in place by way of bolt 131, plate 133 (having a threaded aperture), bolt 135, and bolt 137. Adjustment of these bolts and plate 133 may be carried out to vary the vertical distance between the bottom of frame 83 and the top of extension arm 121 to rotate the extension arm 121 about the socket 85 and hence to cause rotation of the arm 27. Increasing the distance between the bottom of frame 83 and the top of arm 121 will rotate the pivot pin 65 of the channel in a slightly forward plane which may be desirable in order to position the channel 23 in a slightly forward plane when it is in its carrying position. This will locate the motorcycle in a plane inclined or tilted slightly forward (toward the front of the vehicle) rather than in an exact vertical plane when the channel is moved to its supporting position above the surface 29A of the arm 29. This has advantages in that it will insure that the channel 23 and hence the motorcycle will not swing back towards the person while it is being locked in place on the support arm 29.

By coupling the support arm 27 to the frame 83 as described the torque will be borne primarily by the frame 83 rather than by the bumper 81 as the channel is rotated to its various positions.

The socket 87 is coupled to the bumper 81 by way of clamp bars 141 and 143, bolts 145, 147, 149, and 151, and nuts 155, 157, 159, and 161 respectively. A bolt 163 is threaded through a nut 165 secured to the top of the socket 87; through an aligned aperture formed through the top of the socket 87; and into one of a plurality of apertures 167 extending through the top of arm 29 to adjust the position at which the arm 29 extends outward from the motor vehicle.

A U-bolt 171 (see FIGS. 20 and 21) is located in the channel 81A of the frame 81 and straddles bolts 149 and 151 and the socket 87. This U-bolt acts as a brace for the support arm 29. Adjustment of its nuts may be carried out to level the support arm 29 or to tilt it slightly forward to correspond with the position of arm 27.

In one embodiment, the channel 23 has a length of about 6 feet and a width of about 5 inches. The carrier of the present invention can safely load, carry, and unload motorcycles or the like having a weight of up to 450 pounds and even greater.

In the embodiment disclosed above, the pivot pin 65 was described as having its head 65A keyed into aperture 64 to prevent the pin from rotating and having its other end secured by a nut 75. In an alternative coupling arrangement, the shaped aperture 64 may be large enough to let the shaped head 65A pass completely through the base 23C of the channel whereby it will rest on the cheek plate 57 with the bottom of the pin 65 extending through the cheek plates 57, 51, 53, and through plate 59. The aperture 57A will prevent the head 65A from passing through the cheek plate 57. In this arrangement, the nut 75 is not needed and the rod 65 may be free to rotate while held in its aligned apertures.

Figure 22:
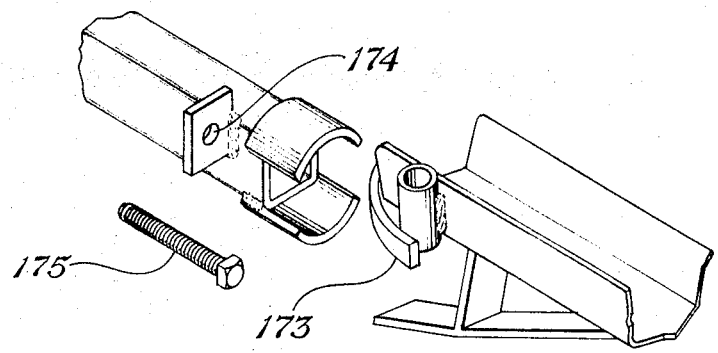
FIG. 22 illustrates an adjustable swing stop which swingback employed to facilitate loading and swinback of a motorcycle.
Figure 23:
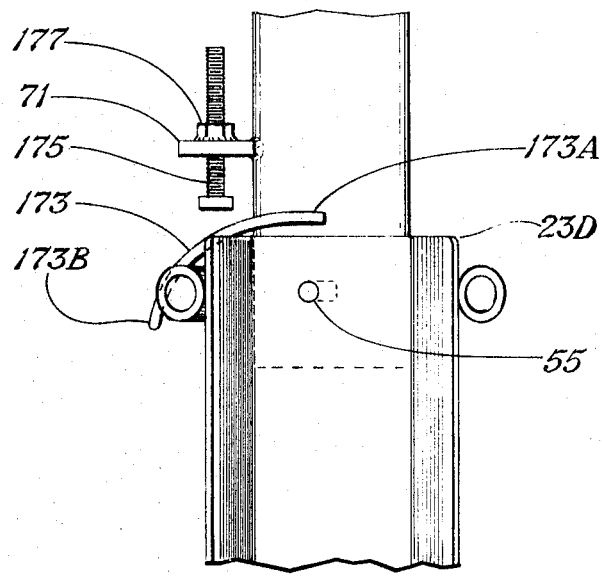
FIG. 23 is a top view of the channel and support arm showing the swing stop.
Figure 24:
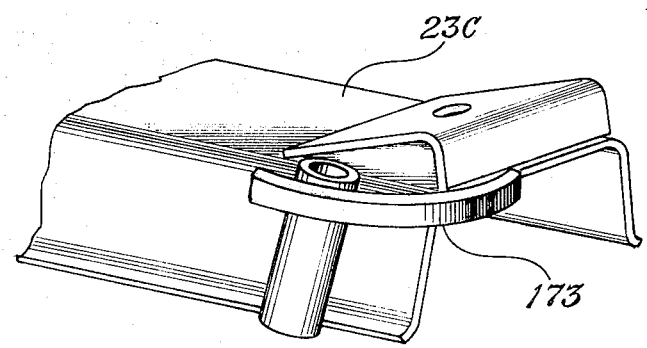
FIG. 24 is a view of the channel with its bottom turned up showing a part of the swing stop.

Referring now to FIGS. 22, 23, and 24, there will be described an adjustable swing stop arrangement which may be provided to stop the channel 23 when it is rotated downward to a position whereby its end 23E is slightly above the ground when in an unloaded condition. The purpose of this arrangement is to allow the springs of the motor vehicle to contribute to the lifting of the motorcycle when loaded onto the channel and to prevent the channel from dragging along the ground when loaded, to facilitate swingback to the carrying position. As seen in FIGS. 22–24, the swing stop comprises a spiral shaped stop bar 173 welded to the channel end 23D at the bottom thereof near its base 23C. One end 173A of the spiral stop bar extends around the end of the channel 23 and the other end 173B spirals around to the side of the channel. The distance from end 173B to the pivot axis 55 is greater than the distance from end 173A to the pivot axis. A threaded aperture 174 is formed through the stop 71 for receiving the threaded end of a bolt 175. The bolt 175 may be threaded outward to a position whereby its head 175A will contact the curved surface of the spiral stop bar 173 when the channel 23 has been swung to a desired position. When the head 175A contacts the front surface of the bar 173 it will stop further rotation of the channel as it is swung downward. A jamb nut 177 is provided to securely hold the bolt 175 in place. Preferably the bolt 175 is threaded to a position whereby the channel will stop at a position whereby its end 23E is 3 or 4 inches above the ground when in an unloaded condition. When the motocycle is rolled from the ground onto the channel, the weight of the motorcycle will compress the springs of the motor vehicle and lower the rail to a position whereby its end 23E touches or barely touches the ground. At this point the full weight of the motorcycle is supported by the motor vehicle and when swingback begins, the channel will immediately lift off of the ground and will not drag along the ground in the swingback operation. If the channel, when unloaded, were allowed to swing downward until its end 23E touched the ground, a motorcycle when loaded, would compress the springs of the motor vehicle whereby part of the weight of the motorcycle would be supported by the ground where the channel end 23E rested on the ground. Thus during swingback the channel end 23E would drag along the ground a distance before it would raise above ground level and allow the full weight of the motorcycle to be borne by the motor vehicle.

In one embodiment, the correct adjustment may be obtained by swinging the channel down with a motorcycle loaded until the end 23E of the channel barely touches the ground. The bolt 175 may then be adjusted to a position whereby it makes contact with the swing stop bar 173. When the motorcycle then is rolled off of the channel, the springs of the motor vehicle will raise its frame and bumper and hence will lift the channel and its end 23E up above the ground. When it is desired to load a motorcycle onto the channel, one may roll the front wheels of the motorcycle onto the channel which will cause the springs of the motor vehicle to be compressed and hence the channel end 23E to be lowered. Thus the front of the motorcycle will be partially supported at this position by the springs of the motor vehicle. Further movement of the motorcycle up the channel will cause the channel to be lowered further and when it is fully located on the channel, the springs of the motor vehicle will be supporting the full weight of the motorcycle. Swingback may then be accomplished without the channel end 23E dragging along the ground.

I claim:

1. A carrier for carrying a two-wheeled cycle on a motor vehicle, comprising:

an elongated frame member having a base and two extending side means for supporting a two-wheeled cycle, two support means adapted to be coupled to a motor vehicle at spaced apart positions for supporting opposite ends of said frame member to support and hold said frame member to said vehicle in a carrying position with one edge of said frame member facing outward and the other edge facing inward of said motor vehicle, and means including pivotal means for pivotally coupling one end of said frame member to one of said support means for pivotal movement about a pivot axis to allow the other end of said frame member to be pivoted from said other support means outward and downward toward the ground and at the same time to cause the width of said frame member to tilt toward the ground, the angle formed between the top of said base and said pivot axis when measured along the length of said base, from said other end of said frame member to said pivot axis, being equal to 90° + $\alpha$, where: $\alpha$ is an angle greater than 0° but less than 90°.

2. The carrier of claim 1, wherein:

said pivot axis is located in a non-outward tilted plane extending between said two support means when coupled in place to a motor vehicle.

3. The carrier of claim 1, wherein:

said means including said pivotal means allows said other end of said frame member to swing outward about 180° from said carrying position while allowing the slope of said frame member to increase from about 0° at said carrying position to about 2 $\alpha$ at about 180° from said carrying position and the tilt of said frame member to increase from about 0° at said carrying position to about $\alpha$ at about 90° from said carrying position and then to decrease to about 0° at about 180° from said carrying position.

4. The carrier of claim 1, wherein:

each of said support means has top and bottom sides and outward and inward sides respectively, said inward sides facing each other when said support means are coupled in place to a motor vehicle, said one of said support means having a surface which slopes downward at an angle $\theta$ from its inner side toward its outer side when said one support means is coupled in place to a motor vehicle, said frame member at said one end having a surface which slopes downward at an angle $\phi$ with respect to its base and adapted to engage and extend parallel to said surface of said one support means, said pivot axis extends through said surfaces generally perpendicular thereto.

5. The carrier of claim 4, wherein:

the angles $\alpha$, $\theta$, and $\phi$ are equal to each other.

6. The carrier of claim 4, wherein:

the angles $\alpha$, $\theta$, and $\phi$ are each equal to about 10°.

7. A carrier for carrying a two-wheeled cycle on a motor vehicle, comprising:

an elongated frame member having a base and two extending side means for supporting a two-wheeled cycle, two support means adapted to be coupled to a motor vehicle at spaced apart positions for supporting opposite ends of said frame member to support and hold said frame member to said vehicle in a carrying position with one edge of said frame member facing outward and the other edge facing inward of said motor vehicle, pivotal means for pivotally coupling one end of said frame member to one of said support means for pivotal movement about a pivot axis to allow the other end of said frame member to be pivoted from said other support means outward and downward toward the ground and back to said other support means, said pivot axis of said pivotal means being inclined upward and away from said other support means when said two support means are coupled in place to a motor vehicle to cause said frame member including its base and said one edge to tilt downward when said frame member is pivoted to positions outward from said carrying position.

8. The carrier of claim 7 wherein said pivot axis is located in a non-outward tilted plane extending between said two support means when coupled in place to a motor vehicle.

9. The carrier of claim 7, wherein:

the angle formed between said pivot axis and the top of a horizontal line extending from said other support means to said pivot axis is equal to 90° + $\alpha$, where: $\alpha$ is an angle greater than 0° but less than 90°.

10. The carrier of claim 7 wherein:

said one support means includes a support means pivot surface located in a plane generally perpendicular to said pivot axis, said frame member includes structure at said first end thereof having a frame member pivot surface adapted to engage said support means pivot surface when said one end of said frame member is pivotally coupled to said one support means, said frame member pivot surface being located in a plane generally perpendicular to said pivot axis when said one end of said frame member is pivotally coupled to said one support means.

11. The carrier of claim 10 wherein said pivot axis extends through both of said pivot surfaces when said one end of said frame member is pivotally coupled to said one support means.

12. The carrier of claim 10 wherein:

said one support means has spaced upper and lower support means pivot surfaces facing in opposite directions, parallel with each other, and located in planes perpendicular to said pivot axis, said frame member includes structure coupled to the bottom thereof at said first end and having spaced upper and lower frame member pivot surfaces parallel to and facing each other, said upper and lower frame member pivot surfaces being adapted to engage said upper and lower support means pivot surfaces when said frame member is pivotally coupled to said one support means.

13. A carrier for carrying a two-wheeled cycle on a motor vehicle, comprising:

an elongated channel shaped member for supporting a two-wheeled cycle, two support means adapted to be coupled to a motor vehicle at spaced apart positions for supporting opposite ends of said channel member to support and hold said channel member to said vehicle in a carrying position with one edge of said channel member facing outward and the other edge facing inward of said motor vehicle, each of said support means having top and bottom sides and outward and inward sides respectively, said inward sides facing each other when said support means are coupled in place to a motor vehicle, one of said support means having a surface which slopes downward from its inner side toward its outer side when said one support means is coupled in place to a motor vehicle, said channel member at one end having a surface at an angle with respect to said channel member and adapted to engage and extend parallel to said surface of said one support means, and means for pivotally coupling said first end of said channel member to said one support means when said surfaces engage each other for pivotal movement of said channel member about a pivot axis extending through said surfaces and generally perpendicular thereto.

14. The carrier of claim 13 wherein said pivot axis extends in a plane generally perpendicular to said outward and inward sides of said one support means whereby said channel member may support and carry a motorcycle in its carrying position in a generally vertical plane next to a motor vehicle.

15. The carrier of claim 14 wherein said surface of said channel member is located below the bottom thereof and slopes downward and away from said bottom.

16. A carrier for carrying a two-wheeled cycle on a motor vehicle, comprising:

an elongated frame member having a base and two extending side means for supporting a two-wheeled cycle.

two support means adapted to be coupled to a motor vehicle at spaced apart positions for supporting opposite ends of said frame member to support and hold said frame member to said vehicle in a carrying position with one edge of said frame member facing outward and the other edge facing inward of said motor vehicle, pivotal means for pivotally coupling one end of said frame member to one of said support means for pivotal movement about a pivot axis to allow the other end of said frame member to be pivoted from said other support means outward and downward toward the ground, and stop means coupled to said frame member and to said one support means and which cooperate with each other to stop the frame member at a desired position as it is pivoted downward to locate its other end near but above the ground surface when in an unloaded condition.

one of said stop means being adjustable to allow variation in the height at which said other end of said frame member is located above the ground surface when in an unloaded condition.

17. The carrier of claim 16 whereby said stop means comprises:

structure having a curved surface coupled to said one end of said frame, and a threaded member having one end adapted to be threaded to said support means and having another end adapted to contact said curved surface for stopping the movement of said frame member as said frame member is pivoted downward to a position where said curved surface contacts said other end of said threaded member.

18. The carrier of claim 17 wherein said structure having a curved surface comprises a spiral member having one end coupled to the end of said one end of said frame member at a given distance relative to said pivot axis and another end spiraling around to the side of said one end of said frame member to a position spaced from said pivot axis a distance greater than said given distance.

* * * * *